United States Patent [19]

Manowitz et al.

[11] 3,963,598

[45] June 15, 1976

[54] FLASH HYDROGENATION OF COAL

[75] Inventors: Bernard Manowitz, Brightwaters; Meyer Steinberg, Huntington Station; Thomas V. Sheehan, Hampton Bays; Warren E. Winsche, Bellport; Chad J. Raseman, Setauket, all of N.Y.

[73] Assignee: The United States of America as represented by the United States Energy Research and Development Administration, Washington, D.C.

[22] Filed: Oct. 15, 1974

[21] Appl. No.: 514,876

[52] U.S. Cl. ................................................. 208/8
[51] Int. Cl.² ........................................... C10G 1/02
[58] Field of Search ............... 208/8; 48/123, 119; 201/24, 31; 202/218; 196/112

[56] References Cited
UNITED STATES PATENTS 2,719,112 9/1955 Kearby et al. .................... 208/11
2,971,830 2/1961 Kawai et al. ...................... 48/123

FOREIGN PATENTS OR APPLICATIONS 715,167 9/1954 United Kingdom .................. 208/11

Primary Examiner—Delbert E. Gantz
Assistant Examiner—James W. Hellwege
Attorney, Agent, or Firm—Dean E. Carlson; Leonard Belkin

[57] ABSTRACT

A process for the hydrogenation of coal comprising the contacting of powdered coal with hydrogen in a rotating fluidized bed reactor. A rotating fluidized bed reactor suitable for use in this process is also disclosed. The coal residence time in the reactor is limited to less than 5 seconds while the hydrogen contact time is not in excess of 0.2 seconds.

3 Claims, 2 Drawing Figures

FLASH HYDROGENATION OF COAL

BACKGROUND OF THE INVENTION

This invention was made during the course of, or under a contract with the United States Atomic Energy Commission.

Previous experimental work has shown that coal can be converted to gaseous and liquid hydrocarbon products, such as methane, aromatic liquids, olefins, and aliphatics by means of high temperature, high pressure contact of coal with hydrogen. Typical such processes are described in U.S. Pat. Nos. 3,030,297 and 3,152,063.

The aforementioned processes produce mixtures of gaseous hydrocarbons (i.e., methane) and liquid products. It is known also that if the contact time between the hydrogen and the coal is too long, the hydrogen requirements go up and there is produced increased amounts of lighter gas fractions (i.e., methane) and heavy oils containing a large proportion of undistillable asphaltic constituents.

The currently developing worldwide shortage of liquid petroleum products has increased interest in the conversion of coal to light liquid hydrocarbons suitable for use as fuels. As a result there is increasing interest in the development of processes for the hydrogenation of coal which will improve the conversion in the amount of liquid fractions obtained.

To carry out such a process, efforts have been undertaken to employ a fluidized bed chemical reactor in which it is possible to react efficiently fine powdered coal with hydrogen.

However, an ordinary fluidized bed operating under 1-g (force of gravity) conditions will not meet the required conditions for the following reasons:

1. For rapid heat transfer to the coal by the hot hydrogen, a fairly finely ground coal is required ($<1000\mu$).
2. The allowable superficial gas velocity without excessive carryover of such fine powder is limited to 1 to 2 ft/sec, which limits heat transfer.
3. If the bed is only a minimum of 4 ft. deep, the gas contact time is already 4 sec, much too long.
4. If the gas velocity is increased in an effort to reduce contact time, carryover increases, and at 15 to 30 ft/sec gas velocity the entire bed carries over, so that coal, gas, hydrogen, and other products remain in contact for much too long a time.

The possibility of meeting the necessary short time chemistry conditions in a stationary fluidized bed thus fails to exist.

SUMMARY OF THE PRESENT INVENTION

In accordance with the principles of this invention it has been discovered that the production of liquid hydrocarbon from the hydrogenation of coal can be maximized by contacting powdered coal in the particle size range of 50 to 500 microns with hydrogen in a rotating fluidized bed under pressure in the range of about 68 to 280 atmospheres to react at a temperature in the range of 500° to 800° C for a coal contact time not more than 5 seconds and a gas contact time no longer than 0.2 sec followed by rapid cooling to prevent further cracking of the liquid products.

In an alternative embodiment of this invention, there is provided a rotating fluidized bed chemical reactor in which powdered coal can be contacted with hydrogen to react for a suitably short period of time at very high pressure and temperature conditions so as to maximize the production of hydrocarbon liquid products from coal.

It is thus a principal object of this invention to provide for the improved conversion of coal to liquid hydrocarbon products.

Other objects and advantages of this invention will herewith become obvious from the following description of preferred embodiments of this invention.

DESCRIPTION OF THE PREFERRED EMBODIMENTS

Figure 1:
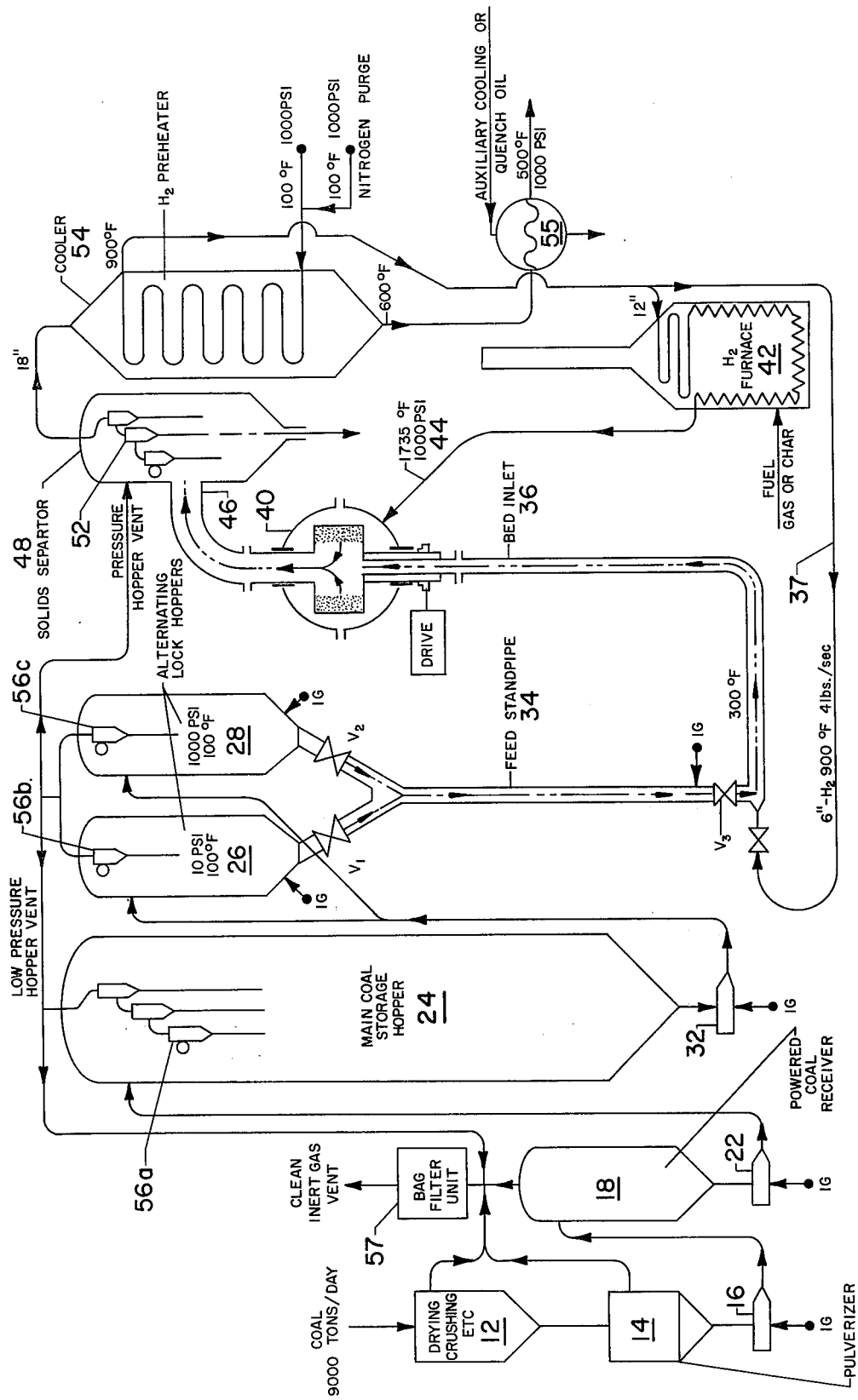
FIG. 1 is a flow sheet illustrating diagrammatically the process of this invention.

For a detailed description of the process of this invention reference is made to FIG. 1.

Coal is dried and crushed in unit 12 followed by pulverizing to an average particle size in the range of 50–500 micron in unit 14. Powder pump 16 delivers the pulverized coal to a receiver 18 utilizing some inert gas (IG) such as nitrogen or $CO_2$ and $N_2$ for partial or light fluidization. If desired, air may be utilized as a fluidizing medium if proper safety precautions against explosions are taken. A powder pump 22 supplies the coal powder to a main coal storage hopper 24 which provides the coal for subsequent use in the process as required.

In order to pressurize the powdered coal for hydrogenation there are provided a pair of alternating lock hoppers 26 and 28 which are alternately supplied by powder pump 32. For example, pump 32 will fill hopper 26 at about 10 psi. After filling, then hopper 28 will be filled at low pressure. While the latter is being filled, hopper 26 will be pressurized to 1000 psi by a pressurized source of inert gas (IG) as shown schematically by the arrow. A pair of valves $V_1$ and $V_2$ in the outlets of hoppers 26 and 28, respectively, are employed to contain or release the powdered coal in the hoppers as required for the operation of the process. Other valves located wherever needed such as in the inlets to the hoppers, in the venting system to be described below, and in the high pressure IG sources would of course be employed to permit the alternate pressurization and depressurization of the hoppers as required.

In FIG. 1, hopper 28 is shown as being pressurized to 1000 psi, and valve $V_2$ would be opened to supply coal to feed standpipe 34. Slide valve $V_3$ would be opened and hydrogen under pressure is supplied to bed inlet pipe 36 from hydrogen transport line 37 to fluidize the powdered coal just sufficiently to permit delivery to rotating fluidized bed chemical reactor 40. A separate supply of hydrogen, at 1000 psi, heated to 1735°F in the particular embodiment shown in a furnace 42, delivers hydrogen by way of one or more hydrogen inlets 44 to maintain fluidization of the coal in rotating fluidized bed reactor 40 as will be more particularly described further below.

The powdered coal and the hydrogen react within reactor 40 and the gaseous products containing the finely divided ash are carried by way of duct 46 to solids separator 48. The powdered ash and any powdered char present are removed from the latter at the bottom thereof and the gaseous products are removed by way of a three stage cyclone separator 52 and passed into a cooler 54 where the gaseous products are cooled to the liquid hydrocarbons. Cooler 54 acts also as shown as a preheater for the hydrogen prior to heating in furnace 42. Further cooling if desired of the products existing from cooler 54 may be conducted in the second stage effluent cooler 55.

The quenching temperature in the effluent gas cooler 55 is chosen at 500°F, a temperature at which no condensation will occur. Napthalene, which is the least volatile component, will be under a partial pressure of 8.7 psia. At this pressure, its condensing temperature would be about 370°F, therefore at 500°F it should be entirely in the vapor phase.

Other components, benzene, toluene, mixed aromatics and mixedaromatics can likewise be shown to be at partial pressures which insure complete vaporization at 500°F, 1000 psia total pressure.

Cyclone separators 56a, 56b, and 56c are employed in main coal storage hopper 24 and lock hoppers 26 and 28 to recirculate the inert gas. Low pressure gas is circulated to a bag filter unit 57 while high pressure gas from the pressurized lock hopper is passed into solids separator 48. Suitable valves, not shown, but as understood in the art, would be employed as required.

Figure 2:
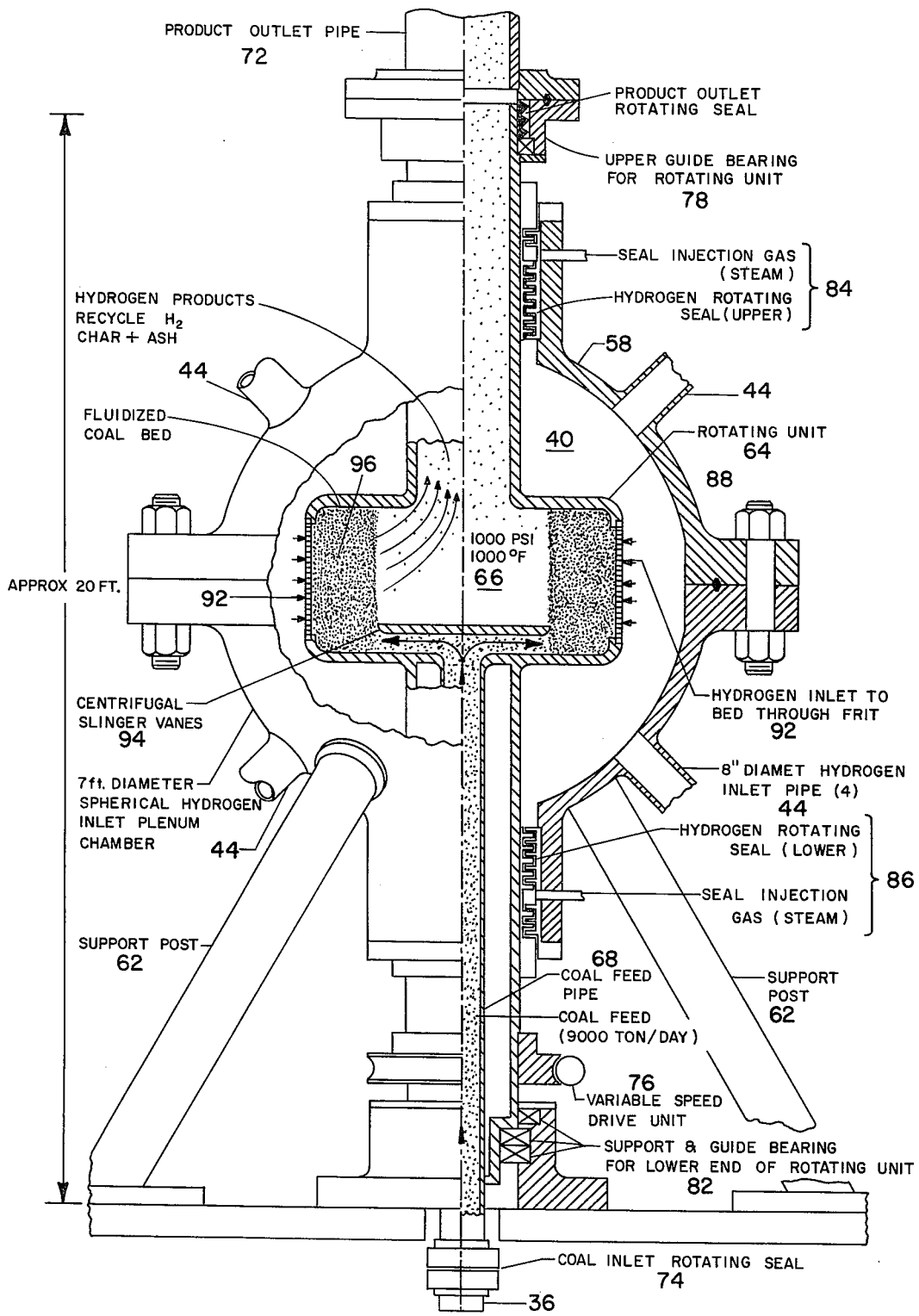
FIG. 2 is an elevation view in partial section of a preferred embodiment of the rotating fluidized bed reactor employed.

For details of the rotating fluidized bed chemical reactor 40, reference is made to FIG. 2. Reactor 40 consists of spherical shell 58 with multiple high pressure and temperature hydrogen inlets 44 supported by posts 62. Within shell 58 is a rotating unit 64 forming a right cylindrical chamber 66 with coal feed pipe 68 and product outlet pipe 72 located on the axis of rotation of unit 64. The inlet and outlet pipes 68 and 72 along with unit 64 rotate together as an integral assembly. The powdered coal is supplied to chamber 66 from bed inlet 36 through a coal inlet rotating seal 74 and coal feed pipe 68. Mechanical drive of the rotating assembly just described is by way of a variable speed drive unit 76 illustrated. As is understood in the art upper and lower guide bearings 78 and 82, respectively, are provided to support the aforementioned rotating assembly. For a purpose which will become evident from the following description, there are also provided a pair of upper and lower seal arrangements 84 and 86, respectively, for the rotating assembly within shell 58.

Rotating unit 64 has a circumferential wall 88 which includes a porous frit 92 along most of its width. The porous frit may be a tightly wound wire network forming a porous cylindrical wall through which gaseous hydrogen can flow. Centrifugal slinger vanes 94 located opposite the opening from coal feed pipe 68 direct the coal dust outwardly into the fluidized bed 96 formed within and along the outer periphery of chamber 66.

In the startup and operation of the apparatus described, raw coal is dried, crushed and pulverized to 50–500 micron size and conveyed to powdered coal receiver 18 equipped with an exhauster and bag filter to prevent escape of fines. The fines may be returned to the coal receiver.

As an alternative, the coal from pulverizer 14 may be delivered directly to the main coal storage hopper 24 if pressure and transport limitations do not rule it out.

With the alternating feed hoppers 26 and 28 depressurized, one will be filled with powdered coal from the coal storage hopper. It will then be pressurized to 1000 psi while being fluidized gently. The overhead inert gas passes through cyclones 56b or 56c and to one of several bag filter units such as unit 57. The other hopper will then be filled and pressurized.

Rotating unit 64 is then started and operated at an appropriate speed for the proposed run.

Ambient nitrogen is then introduced to purge all air from unit 64, passing through furnace 42, bed inlet line 36, out through solids separator 48, cooler 54, and the after cooler 55. The pressure is gradually raised to 1000 psi.

The hydrogen heating furnace 42 is then fired, and the temperature gradually brought up to 1700°F while all equipment is checked.

The nitrogen flow is gradually reduced while the hydrogen flow is increased, maintaining 1700°F furnace outlet temperature. When all nitrogen is cut out and the unit is operating on hot hydrogen, feed standpipe 34 is fluidized and it is made certain that the pressure at the bottom of the standpipe is well in excess of that needed to transport coal into reactor 40. Transport hydrogen at 900°F is flowing in transport line 37.

Coal inlet valve $V_3$ is then cracked to admit a small quantity of coal enough to fill the rotating bed reactor 40 and then shut. As soon as possible, analyses are made of the product. This batch operation may be repeated several times. A check of the material in the char and ash collector is made.

When it appears that mechanical functions are satisfactory and analytical work indicates products in the desired range, continuous coal feed may be undertaken, adjusting the hydrogen flow rate and temperature to achieve satisfactory contact time and temperature in the reactor and design capacity of coal feed. By contact time herein is meant residence time in the reaction zone. It should be noted that the reactor described herein is eminently suited to separate the coal residence time from the hydrogen residence time. The coal must stay longer in the reaction zone to give optimum yields but the hydrogen must carry away the reaction products faster in order to increase the yields.

The reaction products at 500°F and 1000 psi would flow to suitable conventional distillation and separation plant.

When one feed hopper is emptied, a switch is made to the other; then depressurizing and refilling the first hopper can take place.

With regard to the rotating fluidized bed established in reactor 40, as a result of the rotation, a radial centrifugal force is developed which, in moderate-sized vessels such as 5 to 10 ft in diameter, with bed depths of 1 or 2 feet, reaches 30 to 50 g at rotational speeds of 250 to 500 rpm. This centrifugal force essentially overrides the 1-g earth's gravity downward force and the bed material lines up against the outside wall of unit 64 as shown.

Fluidizing hydrogen gas enters plenum chamber 40 as shown and flows radially inward through frit 92 and reacts with and fluidizes bed 96 of finely divided solids. The centrifugal outward force of the bed is essentially balanced by the ingoing pressure force of the gas passing through frit 92, so that bed 96 is supported by the gas flow. The reacted and recycle gas leaves the surface of the bed and curves gradually toward the product outlet pipe 72. Char and ash will also leave through outlet pipe 72 due to the decrease in size or density of the particles. The theory and design of the rotating fluidized beds have been developed and experimentally verified in several past investigations. This is described in reports BNL 50362 and 50321 issued by the Brookhaven National Laboratory.

Because of the high gravitational field created by rotation of the fluidized bed, much higher gas velocities can be used compared with a 1-g bed. This results in higher heat and mass transfer coefficients which yield significantly improved performance and capacity characteristics compared with a 1-g bed. Moreover, short residence time chemistry conditions can be met.

As illustrated in FIG. 1, the coal solids can be introduced into bed 96 continuously. Removal of the solids can be done either by increasing gas velocity until the solids carryover reaches the desired removal rate, or the bed level can be increased until it overflows the outlet nozzle, or a mechanical scoop could be embodied through outlet pipe 72 to scrape off a desired amount of solids. If desired, the coal solids can be introduced into bed 96 intermittently and the apparatus could be operated as a batch process.

EXAMPLE

A coal liquefaction plant in accordance with this invention and as illustrated and described above in connection with FIGS. 1 and 2 has been designed having a capacity of 9000 tons of raw wet coal a day (380 tons/hr). In this design, 60% of the carbon in the coal is converted to hydrocarbons in reactor 40, with the remaining 40% being char and ash. The crude aromatic oil production approximates 36,000 bbl/day. The char is employed for hydrogen manufactures. It will be seen from the following details that the centrifugal hydrogenator (reactor 40) is relatively small and convenient.

The following assumptions were used in this design:
Product composition shown in Table I.
Pressure of reaction-1000 psia, or 68 atm.
Temperature of reaction-100°F, or 1460°R.
Hydrogen temperature not over 1800°F based on material limitations.
Rotating bed design provides for a fraction of a second hydrogen contact time and a few seconds for coal residence time in the reactor, with 60% of 9000 tons/day converted.
Volume/lb mol = 380 ft$^3$ standard conditions.
Cp coal = 0.34 Btu/lb—°F.
Cp H$_2$ = 3.5 Btu/lb—°F.
Heat transfer coefficient, overall in fluidized bed — up to 1000 Btu/hr-ft$^2$—°F.
Coal particle size range — 50 to 500 microns.
Coal density — 90 lbs/ft$^3$
Initial fluidization bed density — 45 lbs/ft$^3$
Coal freely fluidized bed density — 30 lbs/ft$^3$
Feed coal transport density to reactor — 20 lbs/ft$^3$ to as low as 10 lbs/ft$^3$
Total surface area coal at 30 lbs/ft$^3$ is estimated to be 1200 to 3000 ft$^2$/ft$^3$ for particles range of 50–500 microns
Acceleration for 500 micron coal with hydrogen at 68 atmospheres and 1000°F, Ve (gas velocity) for minimum fluidization, based on work shown on page 20 of BNL 50362, were calculated as follows:

| Ve, ft/sec | 1 | 5 | 10 |
|---|---|---|---|
| acceleration/ft/sec$^2$ | 104 | 940 | 3000 |

Latent heat of vaporization of hydrocarbons — 160 Btu/lb.
Cp hydrocarbons — 0.6 Btu/lb — °F.
Overall heat of reaction assumed negligible.
Raw coal temperature — 100°F, after drying.

Table II summarizes the properties of the fluidized bed.

For 9000 tons/day at 60% conversion, there will be needed about 5400 tons/day of carbon in the bed effluent gases. This is 125 lbs/sec carbon. Along with this will go some 83 lbs/sec char and ash.

Since only 125 lbs/sec carbon is needed in the gases, to meet the postulated condition of 60% conversion of the raw coal, the necessary hot volume is 182 ft$^3$/sec. The recycle hydrogen will be 21.8 lbs/sec.

The dust (ash and char) loading in the effluent gas will be 0.45 lbs/ft$^3$. This is quite dilute and should allow the mixture of effluent product gases and char and ash to be transported out of the reactor readily.

With regard to the rotational speed required for unit 64, previous work has indicated that to contain small particles, a gravitational force of about 3000 ft/sec$^2$ will be needed for Ve = 10 ft/sec, as indicated above. This will require a rotational speed of 425 rpm that will produce an acceleration of 3000 ft/sec$^2$ at 1.5 ft internal radius.

It is thus seen that a relatively small rotating bed of fluidized coal (containing an inventory of only about 1/2 ton) in a relatively small vessel rotating at a moderate speed, can centrifugally hydrogenate coal to liquid hydrocarbons at an extra-ordinarily high rate considering the equipment size.

The capacity for gas handling per square foot of bed, is more than a factor of ten greater than for an ordinary fluidized bed. Moreover the hydrogen contact time and coal-in-reaction-zone residence time in an ordinary fluidized bed are such that nothing more significant than ordinary coke oven products might result.

With regard to the amount of transport hydrogen required, as shown above, about 208 lbs/sec of coal are introduced into the bed. With a fluidized density of this flowing coal of 20 lbs/ft$^3$ the flow rate is 10.4 ft$^3$/sec. At 90 lbs/ft$^3$ solid density, the coal occupies 20/90 = 0.22 ft$^3$. The remaining 0.78 ft.$^3$ is H$_2$. Therefore, the hydrogen flow rate is 8.1 ft$^3$/sec, at 1000 psi (68 atm) at about 300°. The density of H$_2$ will be 0.25 lb/ft$^3$.

Hence, the transport hydrogen is around 2 lb/sec, which is not a large fraction of the total hydrogen and should not upset the operation. In fact, one could double this and make the quantity of fluidized coal entering the transport pipe about 20.8 ft$^3$/sec at a density of 10 lbs/ft$^3$.

The estimated costs involved in this example are enumerated in Tables III and IV.

By rapid cooling herein is meant that the effluent from the fluidized bed is cooled to the quenching temperature within a few (e.g. 3) seconds. Porous frit 92 has openings small enough to prevent any of the cool dust from escaping.

Table I

| Substance | Assumed Composition of Reactor Effluent | | | C | % by Wt | H$_2$ |
|---|---|---|---|---|---|---|
| | Mols | % by Vol | Formula | | | |
| Benzene | 8 | 15 | C$_6$H$_6$ | 576 | 11.8 | 48 |

Table I-continued

| Substance | Assumed Composition of Reactor Effluent Mols | % by Vol | Formula | C | % by Wt | $H_2$ |
|---|---|---|---|---|---|---|
| Toluene | 14 | 26 | $C_7H_8$ | 1176 | 24.4 | 112 |
| Xylene | 16 | 30 | $C_8H_{11}$ | 1540 | 31.7 | 176 |
| (1)Mixed Aromatics | 7 | 14 | $C_9H_{12}$ | 756 | 15.6 | 84 |
| Ethylbenzene | 3 | 5.5 | $C_8H_{10}$ | 288 | 6.0 | 30 |
| Naphthalene | 4 | 7.5 | $C_{10}H_8$ | 480 | 10.0 | 32 |
| Methane | 2 | 2 | $CH_4$ | 24 | 0.5 | 8 |
| | (3)54 | 100 | | 4840 | 100 | 490 |
| (2)Hydrogen | 400 | | | 0 | | 800 |
| | 454 | | | 4840 | | 1290 |

(1)The formula for mixed aromatics is arbitrary. Variation here will not affect the overall result appreciably.
(2)Hydrogen at 1200°F to 1800°F will be used to heat the coal, therefore a large excess (recycle) is needed.
(3)The effluent gas from the reactor contains 54 mols, or about 12% by volume of product gas.

Table II

Properties of Fluidized Bed

| | |
|---|---|
| Overall dimensions | 3 ft. ID × 2.5 ft. long × 1 ft. deep × 5 ft. OD |
| Internal area | 23.5 ft² |
| Volume | 31.5 ft³ |
| Ve | 9.0 ft/sec |
| Gas exit area | 6.35 ft² |
| Reactor exit gas velocity | 30 ft/sec |
| Product gas exit velocity | 60 ft/sec |
| Gas contact time | 0.111 sec |
| Coal in bed | 950 lbs |
| Residence time | 4.6 sec |

Table III

Aromatics Crude from Coal in the Rotating Fluidized Bed Process
36,000 bbl/day
Capital Cost Estimate*

| Description | $ MM |
|---|---|
| Coal Preparation | 11.5 |
| Separation | 4.7 |
| Rotating Fluidized Bed Reactor | 6.0 |
| $H_2$ Plant | 21.5 |
| $O_2$ Plant | 7.5 |
| Heat Exchanger | 0.8 |
| Compressor | 3.7 |
| Fired Heater | 3.4 |
| Hydrotreating | 8.6 |
| | 67.7 |
| General Facilities | 6.8 |
| Total Capital Cost | 74.5 |

*Cost of coal mine and land not included.

Table IV

Annual and Unit Manufacturing Cost for Production of Aromatic Crude from Coal by the Rotating Fluidized Bed Process

| | $ MM |
|---|---|
| Fixed Cost at 18% of investment | 13.60 |
| Labor 18 men/shift | 0.80 |
| Supervision at 15% of labor | 0.12 |

Table IV-continued

Annual and Unit Manufacturing Cost for Production of Aromatic Crude from Coal by the Rotating Fluidized Bed Process

| | $ MM |
|---|---|
| Maintenance at 4.5% of investment | 3.37 |
| Consumables | 1.71 |
| Plant Supplies at 15% of Maintenance | 0.50 |
| Payroll burden at 20% of labor & supervision | 0.18 |
| Plant overhead at 50% of labor, supervision, maintenance and supplies | 2.33 |
| | 22.61 |
| Unit Cost | |
| Based on 36,000 Bbl/day | 4.18 /gal |
| Operating cost of generating $H_2$, at 6700 cu.ft. per barrel | 3.84 /gal |
| Total Unit Cost | 8.02 /gal |

What is claimed is:

1. A process for the hydrogenation of coal to maximize the production of liquid hydrocarbons, comprising contacting in a rotating fluidized bed substantially dry powdered coal having a particle size in the range of about 50–500 microns with hydrogen gas at temperatures to produce a reaction temperature between about 500° C and 800° C, at a pressure in the range of about 68 to 280 atmospheres for a coal residence time of not in excess of five seconds and hydrogen contact time not in excess of 0.2 sec to produce liquid hydrocarbons, followed by rapid cooling to a temperature sufficiently low to prevent further cracking of the liquid products.

2. The process of claim 1 in which said powdered coal is fluidized with said hydrogen gas and supplied to said rotating fluidized bed and excess from said fluidized bed including the reaction products, ash, char and recycle hydrogen gas are carried off.

3. The process of claim 2 in which the incoming powdered coal is fluidized with said hydrogen gas below the reaction temperature, said bed being supplied directly with hydrogen at a sufficient temperature to conduct the aforesaid reaction, said directly supplied hydrogen maintaining the overall fluidization of said bed and furnishing the majority of the heat required to heat the coal.

* * * * *